UNITED STATES PATENT OFFICE.

STEPHEN SAMUEL BATELY, OF MITCHELL, SOUTH DAKOTA, ASSIGNOR TO LILLY BATELY, OF SAME PLACE.

COMPOUND FOR REMOVING TAINT OF ONIONS OR WEEDS FROM BUTTER.

SPECIFICATION forming part of Letters Patent No. 624,891, dated May 9, 1899.

Application filed November 6, 1896. Serial No. 611,246. (No specimens.)

*To all whom it may concern:*

Be it known that I, STEPHEN SAMUEL BATELY, a citizen of the United States, residing at Mitchell, in the county of Davison, State of South Dakota, have invented a new and useful composition of matter to be used for cleansing and purifying butter and removing therefrom all onion and weedy flavors and unnatural taints during the process of churning, of which the following is a specification.

My composition consists of the following ingredients combined in the proportions stated, viz.: nitrate of potash, thirty grains; bicarbonate soda, fourteen grains; borax, fourteen grains; powdered slaked lime, two grains. These ingredients are to be thoroughly mingled and mixed.

In using the above composition caution must be taken that the churn, vat, or other vessel in which the cream is placed be thoroughly clean. Scald the churn, vat, or other vessel with boiling water or steam and rinse with cold water before using. Immediately after skimming reduce the temperature of the cream to 54° Fahrenheit and add salt heavily until the cream in the vat or vessel is thoroughly brined, stir thoroughly and frequently, allowing the temperature of the cream to gradually rise to 60° Fahrenheit and hold at that temperature until the cream is ripe, and then place the cream in the churn. Further precaution must be taken after placing the cream in the churn that its temperature be from 58° to 60° Fahrenheit. Then add the necessary color. In order to insure the desired results, now mix from one to two drams of the composition to each gallon of cream in the churn. If the cream be strongly flavored with onions, weeds, or other foreign matter, it is advisable to use proportionately more of the composition, and then the temperature of the cream should be made proportionately lower. After the butter is separated from the milk in small globules of about the size of a pin-head do not draw off the buttermilk, but dilute it in the churn by adding about one-third the quantity of clear cold water at a temperature of 54° Fahrenheit and turn the churn very slowly by hand ten or twelve times, then draw off one-half of the buttermilk through a strainer and dilute the remainder with clear cold water at a temperature from 50° to 52° Fahrenheit and turn the churn very slowly by hand ten or twelve times, then draw off all the buttermilk and add clear cold water at a temperature of 48° to 50° Fahrenheit until the butter floats in the churn, then turn the churn very slowly by hand for five minutes, and then draw off the water through a strainer. Wash the butter in this way once or twice or until such time as the water drawn from the butter is absolutely clear. The butter will then be perfectly sweet.

The buttermilk being very salty should be diluted with the wash-water from the churn before being given to hogs.

By the use of the above composition and making of the butter as above specified it will be cleansed of all foreign tastes and flavors and will retain its natural flavor.

What I do claim, and desire to secure by Letters Patent of the United States, is—

The herein-described composition of matter for purifying milk, cream or butter, which consists of nitrate of potash, bicarbonate soda, borax, and powdered slaked lime combined in the proportions and in the manner specified.

STEPHEN SAMUEL BATELY.

Witnesses:
J. L. HANNITT,
HOYT COX.